Oct. 4, 1955 J. W. HORNING 2,719,686
PARACHUTE HARNESS
Filed March 27, 1953 3 Sheets-Sheet 3

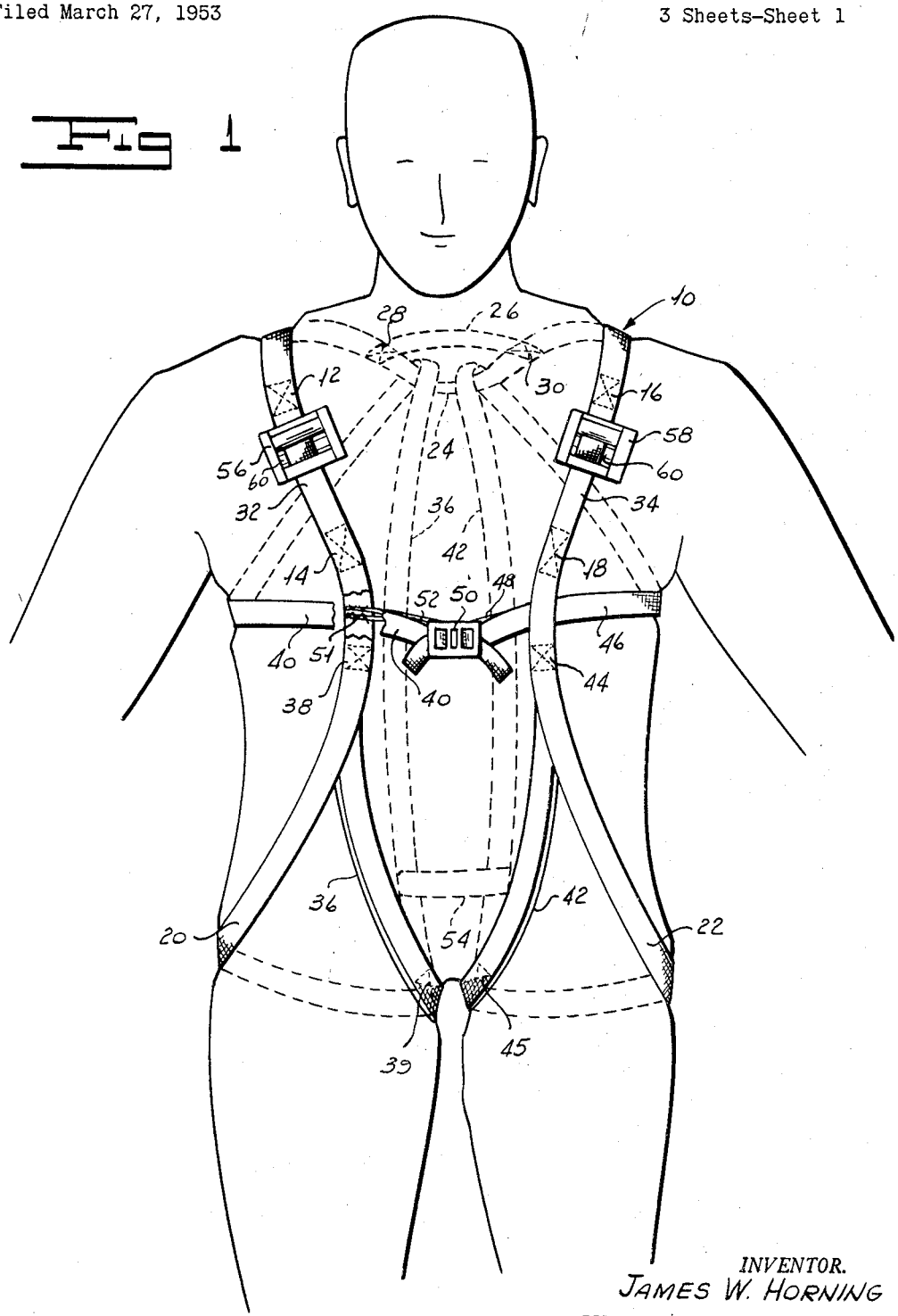

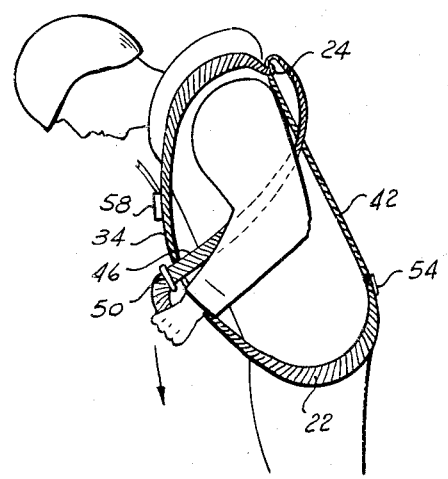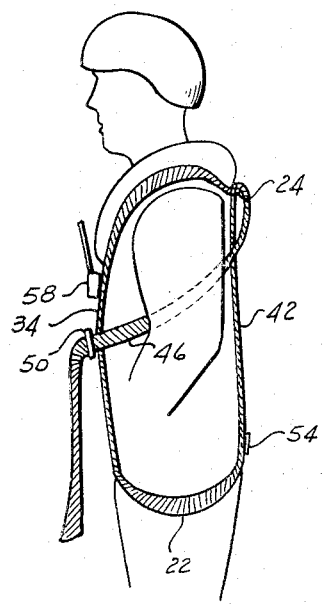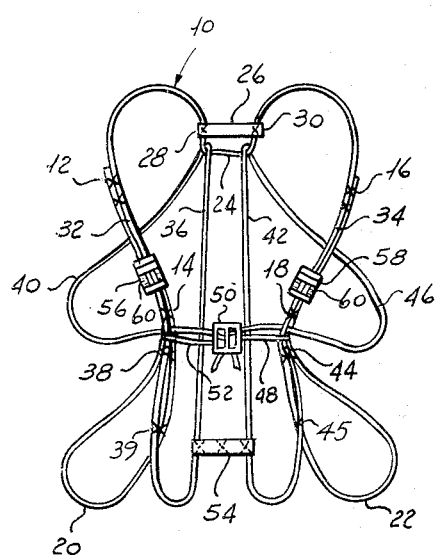

INVENTOR
JAMES W. HORNING
BY
ATTORNEY

United States Patent Office 2,719,686
Patented Oct. 4, 1955

2,719,686

PARACHUTE HARNESS

James W. Horning, Carbondale, Pa., assignor to General Textile Mills, Inc., New York, N. Y., a corporation of Delaware Application March 27, 1953, Serial No. 345,068

9 Claims. (Cl. 244—151)

My invention relates to a parachute harness and more particularly to an improved parachute harness which is simple and lightweight in structure, secure and safe in operation and comfortable and easily adjustable when in use.

Parachute harnesses of the prior art are relatively complex in structure and cumbersome in use. Before the wearer dons the parachute harness a minimum of four separate adjustments to size are necessary. Each of the leg straps and each of the riser straps must be individually adjusted and as many as a dozen metal fasteners or adjusting devices may be required. In view of the extreme importance of weight considerations in present day aircraft, the elimination of any metal from the inside of the aircraft is highly advantageous. The harness must also be adjusted depending upon the clothing worn by the individual. In addition, the design of the harnesses of the prior art is such that the shock encountered when the parachute is opened is largely absorbed in the crotch of the wearer and may cause discomfort or serious injury. The complexity of the harness also reduces the wearer's mobility. I have invented an improved parachute harness which overcomes these disadvantages. It employs a small number of metal fasteners and adjusting devices so as to be lightweight and yet is completely adjustable in a single operation. It is constructed such that the initial shock encountered when the parachute opens is largely absorbed by the legs of the wearer. In addition, the construction is such that the harness is extremely comfortable when in use and permits maximum mobility.

One object of my invention is to provide an improved parachute harness employing a minimum of metal fastening devices.

Another object of my invention is to provide an improved parachute harness which is completely adjustable to fit a wearer in a single operation.

A further object of my invention is to provide an improved parachute harness which is comfortable when in use and which permits maximum mobility.

Still another object of my invention is to provide an improved parachute harness, the construction of which is such that shock encountered when the parachute opens is absorbed by the legs of the wearer.

Other and further objects of my invention will appear from the following description.

In general my invention contemplates the provision of a length of webbing, the ends of which are looped back upon and secured to the webbing to form a pair of slings. A loop is formed intermediate the length of webbing by means of a reinforced crosspiece attached to the length at two points so that the portions of webbing between the loop and each of the slings, respectively, form riser straps. Each of a pair of back straps is secured at one end to one of the slings, respectively, at the juncture between the sling and the length of webbing. The back straps are passed through the loop and extended to form chest straps. Means are provided for securing the chest straps together. In addition, I have provided my improved harness with means for preventing the spread of the riser straps and for preventing the back straps from riding into the crotch of the wearer when the harness is in use.

In the accompanying drawings which form part of the instant specification and which are to be read in conjunction therewith and in which like reference numerals are used to indicate like parts in the various views:

Figure 1 is a front view of my improved parachute harness showing the relative disposition of the parts when the harness is in use.

Figure 2 is a side view on a reduced scale of my improved parachute harness in use when being adjusted.

Figure 3 is a side view on a reduced scale of my improved parachute harness in use after adjustment.

Figure 4 is a schematic view of my improved parachute harness showing the relative disposition of parts when the harness is laid out on a flat surface.

Figure 5:
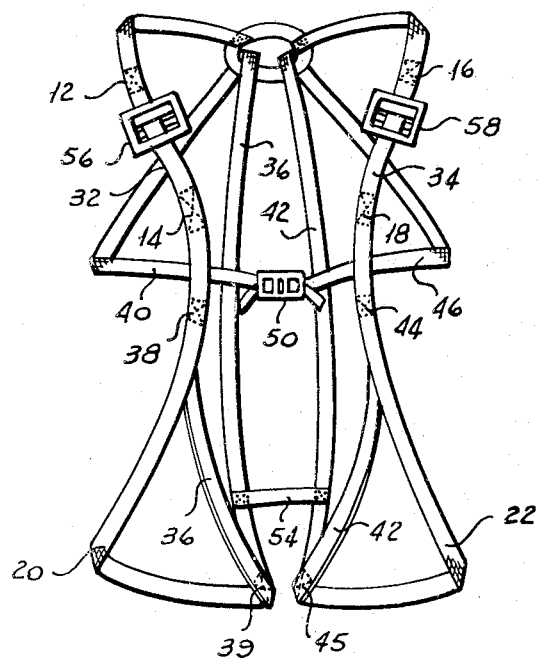
Figure 5 is a view similar to Fig. 4 of a modified form of the harness.

More particularly referring now to the drawings, I provide a length of webbing, generally indicated by the reference character 10, and loop each of the ends of the length back onto the webbing and secure them thereto at points indicated by reference characters 12 and 14 and 16 and 18, respectively, to form a pair of slings 20 and 22. Webbing 10 may be made of any suitable material, but preferably is formed from nylon in such a manner as to be soft and resilient.

At a point intermediate the length of the webbing 10 between the slings 20 and 22 I form a loop 24 by attaching a short crosspiece 26 to the webbing at points indicated by the reference numerals 28 and 30. It is to be understood that I may form each of the slings 20 and 22 on the end of a separate length of webbing and join the ends of the lengths opposite the slings by a suitable ring or loop. Crosspiece 26 and the portion of webbing 10 between points 28 and 30 could, for example, be formed as an integral piece and attached to each of the lengths of webbing extending from the slings. This form of my harness is shown in Figure 5. The portions of webbing between the junctures 14 and 18, respectively, of slings 20 and 22 with webbing 10 and the loop 24 form riser straps 32 and 34.

A first back strap 36 is secured at one end to the sling at a point indicated by reference numeral 38 which is slightly below juncture 14 as viewed in Figure 4. The back strap 36 passes through the loop 24 and is extended to form a chest strap 40. A second back strap 42 is fixed at one end to the sling 22 at a point indicated by reference numeral 44 which is slightly below the juncture 18 between sling 22 and webbing 10 as viewed in Figure 4. Back strap 42 passes through loop 24 and is extended to form chest strap 46. It is to be noted that I may also secure back straps 36 and 42, respectively, to slings 20 and 22 at points indicated by reference numerals 39 and 45 in Figure 4.

I pass a short length of webbing 48 around the center post of a double friction buckle 50, and sew both ends of the length 48 to the portion of webbing 10 between juncture 18 and the point 44. Between juncture 14 and point 38 to which the end of back strap 36 is secured I sew a loop of fabric 52 at a point indicated by the numeral 51. Loop 52 is adapted to be passed over buckle 50 to prevent riser straps 32 and 34 from spreading when the harness is in use. The ends of chest straps 40 and 46 are passed, respectively, through the openings between the layers of webbing extending from stitching 38 to stitching 14 and from stitching 44 to stitching 18 and then inserted in buckle 50.

A reinforced piece of webbing 54 extends between back straps 36 and 42 and is secured thereto at points near the bottoms of the straps as viewed in Figure 4. This piece 54 may be formed of a length of webbing folded upon itself to provide a relatively stiff structure. Strap 54 prevents back straps 36 and 42 from riding together into the crotch of the wearer when the harness is in use.

A pair of riser buckles 56 and 58 of the quickly releasable type well known in the art are slidably mounted on riser straps 32 and 34, respectively, and provided with friction rollers 60 by means of which they may be clamped in any position along the length of riser straps 32 and 34. It is to be noted that these friction clamping rollers 60 also serve to prevent relative movement of the ends of webbing 10 with respect to the body of the webbing and thereby take some of the strain off the means such as sewing which secure the webbing ends to the webbing body at the points indicated by reference numerals 12 and 16.

In use, the wearer steps into the harness by putting one leg through the sling 20 and the other leg through the sling 22. The riser straps 32 and 34 are passed over the shoulders so that buckles 56 and 58 are in front of the wearer and back straps 36 and 42 run down his back. The loop 52 is passed over friction buckle 50 and the harness is thereby held on the wearer. To secure the harness firmly to the wearer, chest straps 40 and 46 are passed under the arms and across the chest, between the layers of webbing from stitching 38 to stitching 14 and stitching 44 to stitching 18, respectively, and inserted in the friction clamping means in buckle 50.

To adjust the harness to size, the wearer bends forward to a position, such as is shown in Figure 2, so that there will be some slack in riser straps 32 and 34. He then grasps the ends of each of the chest straps 40 and 46 and pulls in the direction indicated by the arrow in Figure 2. This downward pull on the chest straps results in an upward pull on back straps 36 and 42, since the chest and back straps are formed as integral pieces passing through loop 24. This downward pull on chest straps 40 and 46 results in an upward pull on riser straps 32 and 34. The operation will result in pulling loop 24 and crosspiece 54 toward one another to shorten the length of the back straps and thereby increase the length of the chest straps. The increase in length of the chest straps can be taken up by pulling the free ends through friction buckle 50 and clamping them securely. When the wearer straightens to an upright position as shown in Figure 3, the harness will be tightened further and thus securely held on the body. The harness may, of course, be adjusted to any desired degree of tightness.

The parachute risers are attached to buckles 56 and 58 and the force exerted by the parachute in opening will create an upward pull on riser straps 32 and 34 through the buckles 56 and 58. In my improved construction, each of the risers will exert a force on its respective sling. These forces will be relatively independent, since slings 20 and 22 are independent of the means by which the harness is held on the body. That is, each of the slings will exert a force on one of the legs of the wearer. When the parachute opens, there will be a pull on both leg slings and the wearer will be thrown back and supported in a sitting position with his back resting against back straps 42, his seat supported by crosspiece 54 and each of the legs supported by one of the slings 20 and 22. It will be apparent that the force exerted by the parachute will be applied primarily to the legs of the wearer by the slings 20 and 22 rather than to the crotch as is the case in harnesses of the prior art.

The harness may easily be removed merely by slipping the ends of the chest straps out of the friction buckle 50, throwing riser straps 32 and 34 off the shoulders and stepping out of slings 20 and 22. As soon as the chest straps are removed the harness is completely loosened for easy removal.

It will be seen that I have accomplished the objects of my invention in providing an improved parachute harness employing a minimum of metal fastening devices. My harness is completely adjustable to size in a single operation. In addition, I have employed a sling construction which insures that shocks applied to the harness will be absorbed on the legs of the wearer rather than applied to the wearer's crotch, thus minimizing discomfort and the chances of injury. My construction also ensures maximum comfort and mobility to the wearer when the harness is in use.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A parachute harness including in combination a length of webbing having a sling formed at each end thereof, a loop formed along the length of webbing intermediate said slings, a pair of back straps, each of said straps being respectively secured at one end to one of the slings, the other ends of said back straps being passed through said loop and extended to form chest straps and means for attaching said chest straps to each other to hold the harness to the body.

2. A parachute harness as in claim 1 including a length of reinforced webbing extending between and secured to each of said back straps.

3. A parachute harness as in claim 1 wherein said means for attaching the chest straps to each other is a double friction buckle.

4. A parachute harness as in claim 1 wherein the loop in said length of webbing is formed by a crosspiece secured to two points along said length of webbing, said points being adjacent the center of said length.

5. A parachute harness including in combination a length of webbing, the ends of which are looped back upon and secured to the webbing to form a pair of slings, a crosspiece attached at two points along said length of webbing to form a loop, the portions of said webbing between said slings and the points to which said crosspiece is attached forming a pair of riser straps, a pair of back straps each respectively secured at one end to one of the slings, said back straps passing through the loop and extended to form chest straps and means for attaching said chest straps to each other.

6. A parachute harness as in claim 5 wherein said means for attaching the chest straps to each other includes a double friction buckle, means for securing said buckle to one of the riser straps and a loop secured to the other of said riser straps, said loop adapted to pass over said buckle to prevent the spread of said riser straps when the harness is in use.

7. A parachute harness as in claim 6 including a stiffened crosspiece extending between and secured to each of the back straps.

8. A parachute harness comprising in combination a pair of lengths of webbing, each of said lengths having a sling formed at one end thereof, a loop joining the other ends of said lengths, a pair of back straps, each of said straps being respectively secured at one end to one of the slings, the other ends of said back straps being passed through said loop and extended to form chest straps and means for attaching said chest straps to each other to hold the harness to the wearer's body.

9. A parachute harness as in claim 8 wherein the portion of each of said lengths of webbing between its sling and said loop form riser straps, said means for attaching the chest straps to each other including a friction buckle, means for securing said buckle to one of the riser straps and a loop secured to the other of said riser straps said loop adapted to pass over said buckle to prevent the spread of said riser straps when the harness is in use.

References Cited in the file of this patent

UNITED STATES PATENTS

| | | |
|---|---|---|
| 1,965,570 | Binnie | July 10, 1935 |
| 2,431,358 | Wilson | Nov. 25, 1947 |
| 2,516,004 | Kajdan | July 18, 1950 |

FOREIGN PATENTS

| | | |
|---|---|---|
| 184,032 | Great Britain | Aug. 10, 1922 |